US009649902B2

(12) United States Patent
Nine et al.

(10) Patent No.: US 9,649,902 B2
(45) Date of Patent: May 16, 2017

(54) LINK ASSEMBLY FOR LONGITUDINAL ARM VEHICLE SUSPENSION

(71) Applicants: Forest H Nine, Bloomfield Hills, MI (US); Jack W Cooper, Novi, MI (US); John A Pelkey, Orchard Lake, MI (US)

(72) Inventors: Forest H Nine, Bloomfield Hills, MI (US); Jack W Cooper, Novi, MI (US); John A Pelkey, Orchard Lake, MI (US)

(73) Assignee: FCA US LLC, Auburn Hills, MI (US)

( * ) Notice: Subject to any disclaimer, the term of this patent is extended or adjusted under 35 U.S.C. 154(b) by 3 days.

(21) Appl. No.: 14/719,421

(22) Filed: May 22, 2015

(65) Prior Publication Data

US 2016/0339755 A1    Nov. 24, 2016

(51) Int. Cl.
*B60G 3/14* (2006.01)
*B60G 7/00* (2006.01)
(Continued)

(52) U.S. Cl.
CPC ............. *B60G 7/008* (2013.01); *B60G 3/14* (2013.01); *B60G 7/001* (2013.01); *B60G 7/02* (2013.01); *B60G 9/003* (2013.01); *B60G 2200/31* (2013.01); *B60G 2204/143* (2013.01); *B60G 2204/41* (2013.01); *B60G 2204/422* (2013.01); *B60G 2206/11* (2013.01)

(58) Field of Classification Search
CPC ...... B60G 7/008; B60G 3/14; B60G 2204/41; B60G 2204/143; B60G 2204/422
USPC ..................... 280/124.128; 267/293, 141.27
See application file for complete search history.

(56) References Cited

U.S. PATENT DOCUMENTS

| 4,537,420 A | 8/1985 | Ito et al. |
| 4,758,018 A * | 7/1988 | Takizawa ............... B60G 3/202 280/124.109 |

(Continued)

FOREIGN PATENT DOCUMENTS

| CN | 103863036 A | 6/2014 |
| DE | 3148726 C1 | 7/1983 |

(Continued)

OTHER PUBLICATIONS

Inoue, JP S60-080914 English Machine Translation.*

(Continued)

*Primary Examiner* — Karen Beck
(74) *Attorney, Agent, or Firm* — Ralph E. Smith

(57) ABSTRACT

A link assembly for coupling a longitudinal arm to a mounting location of a vehicle is provided. The link assembly includes a link body, a first attachment member, a second attachment member, a first bushing assembly, and a second bushing assembly. The first attachment member is disposed in the link body and defines a first axis. The second attachment member is disposed in the link body and defines a second axis. The first bushing assembly is disposed in the link body and supports the first attachment member in the link body. The second bushing assembly is disposed in the link body and supports the second attachment member in the link body. The first axis of the first attachment member is spaced from the second axis of the second attachment member by an off-set distance and the first axis and second axis extend in different, non-parallel directions.

17 Claims, 7 Drawing Sheets

(51) Int. Cl.
*B60G 7/02* (2006.01)
*B60G 9/00* (2006.01)

(56) References Cited

U.S. PATENT DOCUMENTS

| | | | | |
|---|---|---|---|---|
| 5,364,061 | A * | 11/1994 | Ciolczyk | F16C 7/04 180/300 |
| 5,683,098 | A * | 11/1997 | VanDenberg | B60G 9/003 280/124.116 |
| 5,988,672 | A * | 11/1999 | VanDenberg | B60G 11/64 280/124.11 |
| 6,224,046 | B1 * | 5/2001 | Miyamoto | B60G 3/202 267/140.12 |
| 7,207,583 | B2 | 4/2007 | Ross et al. | |
| 2005/0212188 | A1 * | 9/2005 | Endo | F16F 1/3849 267/141.2 |
| 2006/0186629 | A1 * | 8/2006 | Gaupp | B60G 3/06 280/124.135 |
| 2007/0084693 | A1 * | 4/2007 | Byers | A63H 17/262 192/66.1 |
| 2010/0201086 | A1 * | 8/2010 | Sagara | B60G 3/20 280/5.522 |
| 2010/0237580 | A1 * | 9/2010 | Vortmeyer | B60G 7/005 280/124.134 |
| 2011/0033230 | A1 * | 2/2011 | Brunneke | B60G 7/001 403/341 |
| 2011/0285102 | A1 * | 11/2011 | Yu | B60G 7/001 280/124.134 |
| 2012/0068431 | A1 * | 3/2012 | Jakob | B60G 3/145 280/124.128 |
| 2012/0074630 | A1 * | 3/2012 | Kato | B60G 7/008 267/292 |
| 2013/0001915 | A1 * | 1/2013 | Yamada | F16F 1/3876 280/124.177 |
| 2013/0200587 | A1 * | 8/2013 | Branger | B60G 7/02 280/124.13 |
| 2014/0191486 | A1 * | 7/2014 | Rarey | B60G 7/001 280/124.128 |
| 2015/0028556 | A1 * | 1/2015 | Noble | B60G 5/02 280/124.116 |
| 2015/0035246 | A1 * | 2/2015 | Noble | B60G 3/20 280/124.13 |
| 2015/0273967 | A1 * | 10/2015 | Grim | B60G 7/02 267/292 |
| 2016/0185172 | A1 * | 6/2016 | Scheper | B60G 9/02 280/86 |

FOREIGN PATENT DOCUMENTS

| | | | |
|---|---|---|---|
| DE | 3242930 | A1 | 5/1984 |
| DE | 4322910 | A1 | 2/1994 |
| DE | 102013016766 | A1 | 4/2015 |
| DE | 102014113333 | A1 | 5/2015 |
| FR | 2366947 | A1 | 5/1978 |
| JP | S6080914 | A | 5/1985 |
| JP | H1086619 | A | 4/1998 |
| KR | 101500415 | B1 * | 3/2015 ........... B60G 21/052 |

OTHER PUBLICATIONS

Shimanti, JP H10-086619 English Machine Translation.*
International Search Report and Written Opinion dated Jul. 21, 2016 for International Application No. PCT/US2016/029363, International Filing Date Apr. 26, 2016.

* cited by examiner

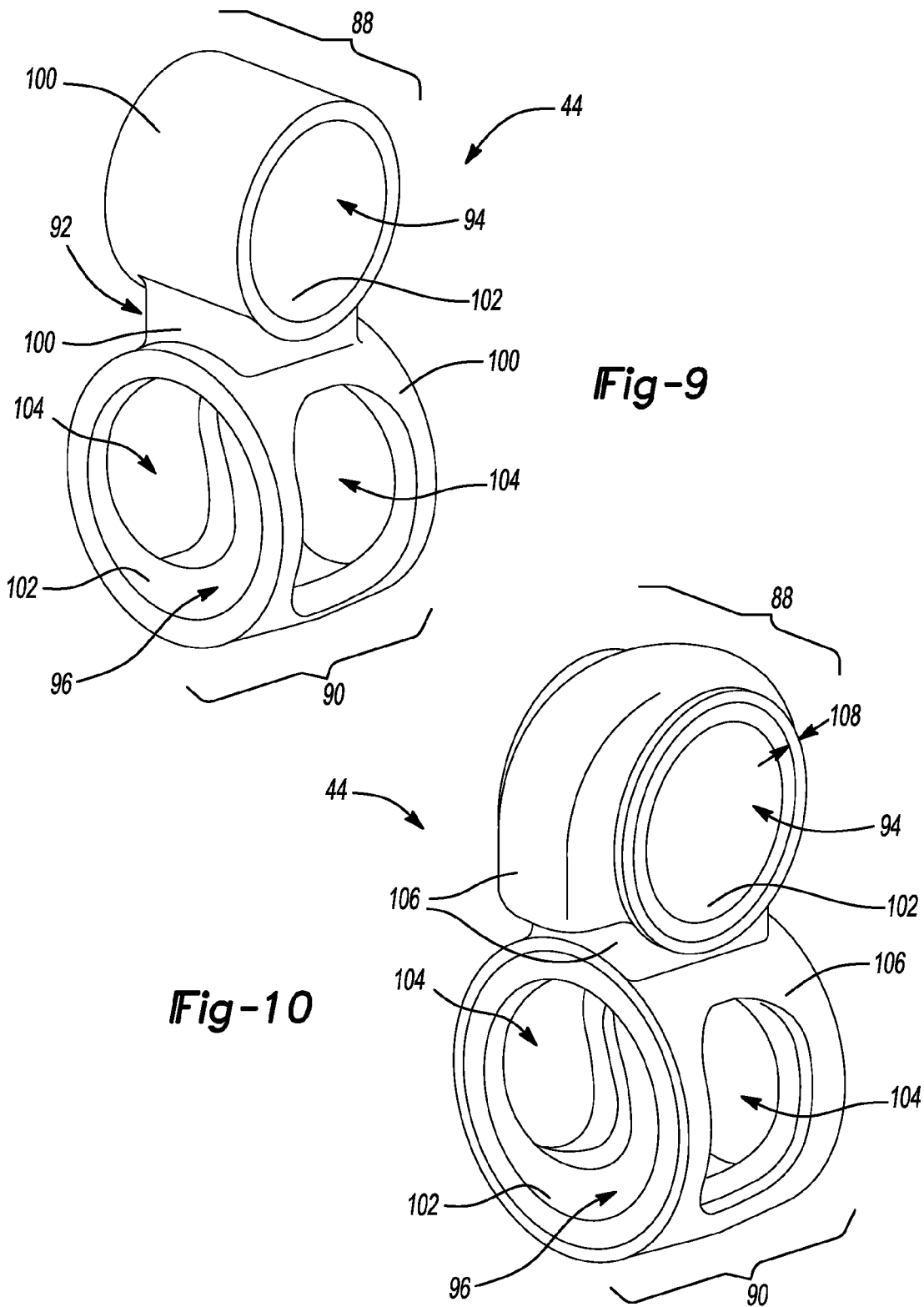

LINK ASSEMBLY FOR LONGITUDINAL ARM VEHICLE SUSPENSION

FIELD

The subject disclosure relates to vehicle suspension assemblies. More particularly, a link assembly that couples a longitudinal arm of a suspension assembly to a body or frame of a vehicle is disclosed.

BACKGROUND

This section provides background information related to the present disclosure which is not necessarily prior art.

Vehicles, such as automobiles for example, are typically equipped with suspension assemblies. Such suspension assemblies are positioned between a mounting location that is disposed on the vehicle and a wheel end assembly. The mounting location is typically disposed on either a body or frame of the vehicle, depending on how the vehicle is constructed. For example, the mounting location may be disposed on the frame where traditional body-on-frame construction is used, while the mounting location may be disposed on the body of the vehicle itself where frameless construction is used. The wheel end assembly supports one or more wheels of the vehicle and may include other vehicle components such as axels, differentials, hub assemblies, and brakes. The suspension assembly allows the wheel end assembly to move relative to the mounting location such that the wheels can move relative to the body and/or frame of the vehicle. As such, the suspension assembly generally improves the road holding, handling, and ride comfort of the vehicle.

One type of suspension assembly utilizes a longitudinal arm that extends between the mounting location and the wheel end assembly. Where this configuration is used at the front of the vehicle, such suspension assemblies are commonly referred to as leading arm suspension assemblies because the wheel end assembly is in front of the mounting location. Where this configuration is used at the rear of the vehicle, such suspension assemblies are commonly referred to as trailing arm suspension assemblies because the wheel end assembly is behind the mounting location. The longitudinal arm typically has a first end that is pivotally coupled to the mounting location and a second end that is pivotally coupled to the wheel end assembly. One or more shock absorbers and one or more suspension springs are installed between the body and/or frame of the vehicle and either the longitudinal arm or the wheel end assembly. The suspension springs bias the wheel end assembly toward an extended position where the wheel end assembly is spaced from the body of the vehicle and the shock absorbers provide a dampening force that opposes the movement of the wheel end assembly to prevent excessive oscillations in the suspension assembly.

A single bushing assembly is typically used to couple the longitudinal arm to the mounting location. An example of this conventional single bushing arrangement is described in U.S. Pat. No. 7,207,583, which issued to Ross et al. on Apr. 24, 2007. The longitudinal arm includes a mounting tube at the first end that receives a cylindrical bushing. A hanger is mounted on the frame and a bolt extends through both the hanger and the center of the cylindrical bushing to pivotally couple the first end of the longitudinal arm to the frame. The bolt therefore defines an axis of rotation for the longitudinal arm and the bushing is made of a compliant material such that the longitudinal arm can move in the vertical and longitudinal directions relative to the hanger to a limited extent due to the compliance of the bushing. This movement in the vertical (up and down) and longitudinal (fore and aft) directions, which can be expressed in terms of travel distance and rate, improves ride quality in comparison to a hard, bushingless pivot. The travel distance and the rate of the bushing are material specific parameters and are therefore interrelated. These parameters can be tuned somewhat by using complex bushing geometries where voids or other features of various shapes are formed in the bushing such that the bushing behaves differently in the vertical direction relative to in the longitudinal direction. More specifically, complex bushing geometries can be used to provide different travel distances in the vertical direction versus in the longitudinal direction and different bushing spring rates in the vertical direction versus the longitudinal direction. However, the material of the bushing limits how great the travel distance differential and the rate differential can be and complex bushing geometries typically increase the cost and decrease the durability of the bushing.

SUMMARY

This section provides a general summary of the disclosure and is not a comprehensive disclosure of its full scope or all of its features.

In accordance with one aspect of the subject disclosure, a link assembly for coupling a longitudinal arm to a mounting location of a vehicle is provided. The link assembly includes a link body, a first attachment member, and a second attachment member. The first attachment member is at least partially disposed in the link body and defines a first axis. The second attachment member is at least partially disposed in the link body and defines a second axis. The link assembly further includes a first bushing assembly and a second bushing assembly. The first bushing assembly is at least partially disposed in the link body and supports the first attachment member in the link body. The second bushing assembly is at least partially disposed in the link body and supports the second attachment member in the link body. The first axis of the first attachment member is spaced from the second axis of the second attachment member by an off-set distance and the first axis and second axis extend in different, non-parallel directions.

In accordance with another aspect of the subject disclosure, a suspension assembly for a vehicle is provided, which includes the link assembly described above. The suspension assembly includes a mounting location that is disposed on the vehicle, a wheel end assembly, and a longitudinal arm. The longitudinal arm extends between the mounting location and the wheel end assembly. The longitudinal aim includes a first end that is coupled to the mounting location and a second end that is coupled to the wheel end assembly. The longitudinal arm has a pocket that is disposed in the first end. The pocket receives the link assembly. The first attachment member of the link assembly is connected to the mounting location and the second attachment member is connected to the longitudinal arm. Accordingly, the link assembly couples the first end of the longitudinal arm to the mounting location on the vehicle. Furthermore, because the first axis of the first attachment member is spaced from the second axis by the off-set distance and because the first axis and the second axis extend in different, non-parallel directions, the first and second bushing assemblies allow the longitudinal arm to pivot relative to the mounting location and allow the first attachment member and the link body to move within the pocket of the longitudinal arm.

Advantageously, the link assembly disclosed herein can provide greater travel distance differential and rate differential than is feasible using a single bushing pivot arrangement. Specifically, the structure of the link assembly can provide a shorter travel distance and a higher spring rate along the first axis (e.g. in the vertical direction) while also providing a longer travel distance and a lower spring rate along the second axis (e.g. in the longitudinal direction) because the relationship between the travel distance along the first axis and the second axis and the spring rate along the first axis and the second axis are more separated (i.e. less dependent on one another) in comparison to single bushing designs. This provides improved steering response, reduced ride harshness, and increased shock absorber efficiency over conventional single bushing assemblies. At the same time, the cost and durability penalties associated with complex bushing geometries can be avoided.

BRIEF DESCRIPTION OF THE DRAWINGS

Other advantages of the present invention will be readily appreciated, as the same becomes better understood by reference to the following detailed description when considered in connection with the accompanying drawings wherein:

FIG. 9 is a side perspective view of the link body of the exemplary link assembly illustrated in FIG. 5;

FIG. 10 is a side perspective view of the link body illustrated in FIG. 9 where the link body has an over-molded snubber of variable thickness shown covering the outer surface of the link body;

DETAILED DESCRIPTION

Figure 1:
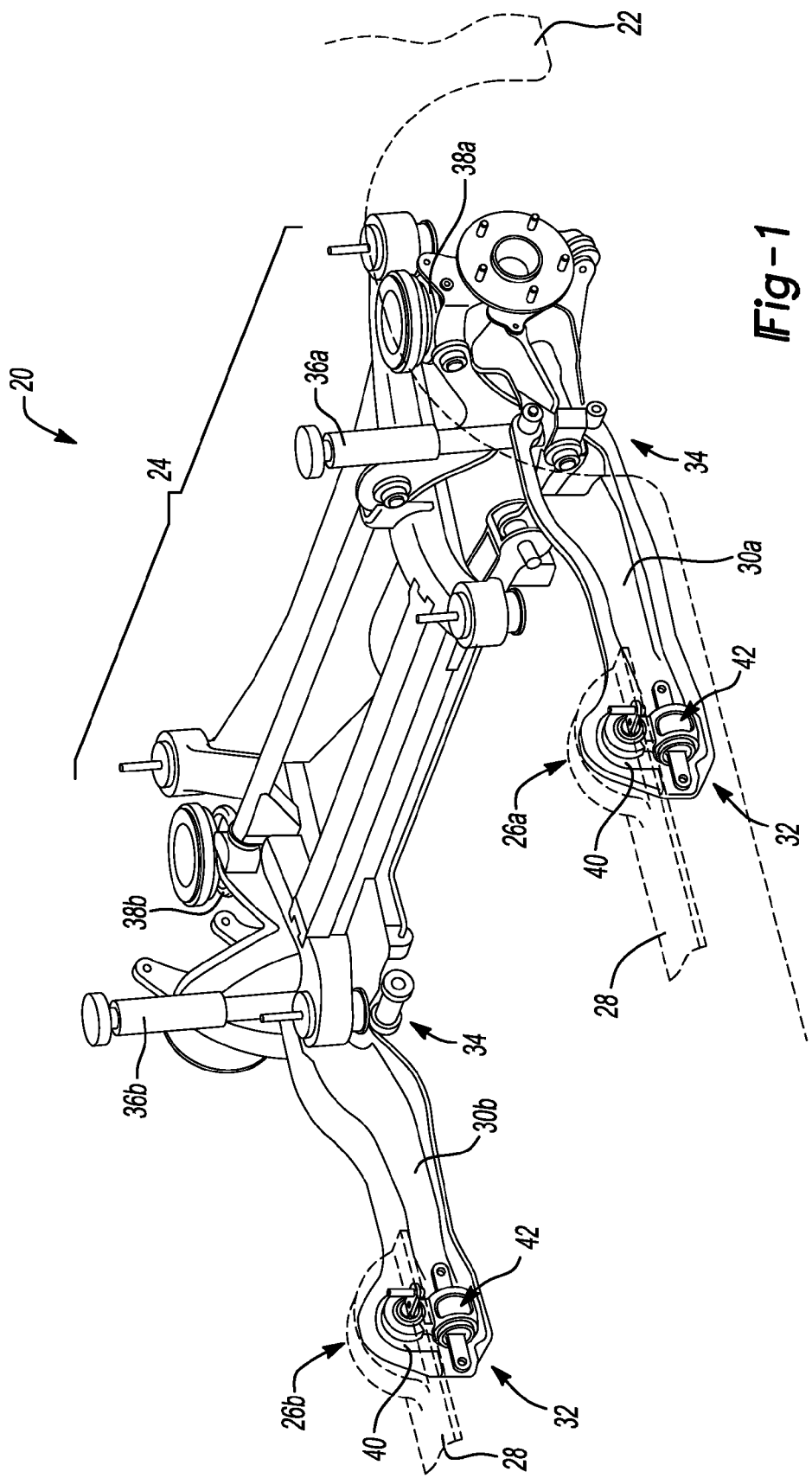
FIG. 1 is a side perspective view of an exemplary suspension assembly constructed in accordance with the subject disclosure.

Referring to the Figures, wherein like numerals indicate corresponding parts throughout the several views, a suspension assembly 20 for a vehicle 22 is illustrated.

Example embodiments will now be described more fully with reference to the accompanying drawings. Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When an element or layer is referred to as being "on," "engaged to," "connected to," or "coupled to" another element or layer, it may be directly on, engaged, connected or coupled to the other element or layer, or intervening elements or layers may be present. In contrast, when an element is referred to as being "directly on," "directly engaged to," "directly connected to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

Spatially relative terms, such as "inner," "outer," "beneath," "below," "lower," "above," "upper," and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

Figure 2:
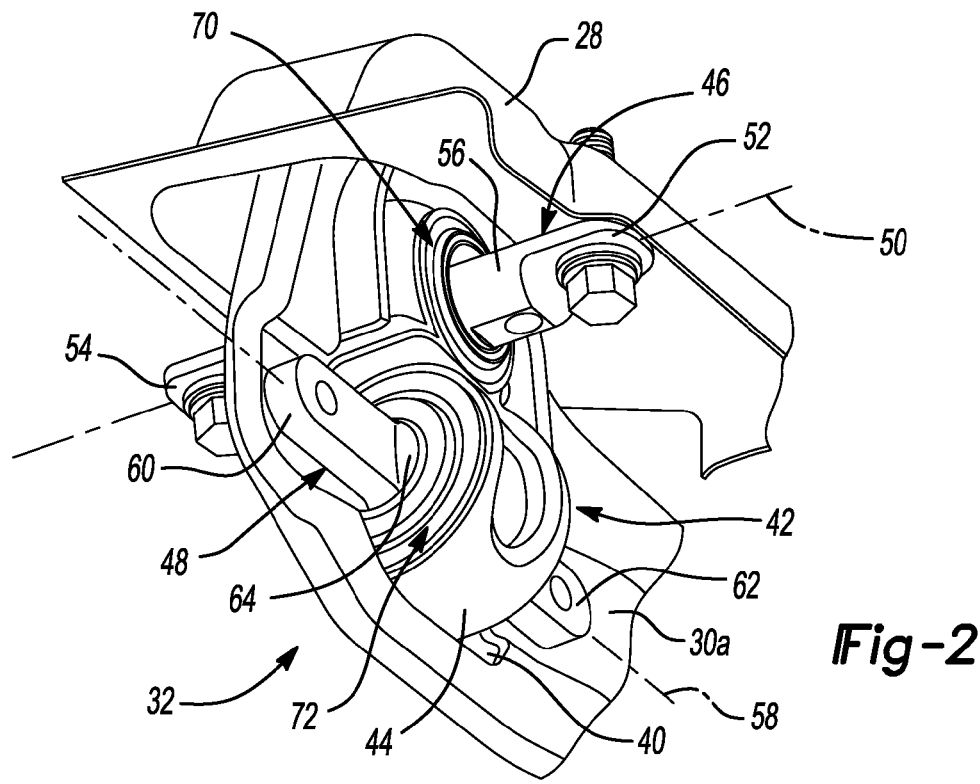
FIG. 2 is a side perspective view of an exemplary link assembly shown installed on a longitudinal arm of the exemplary suspension assembly illustrated in FIG. 1.
Figure 3:
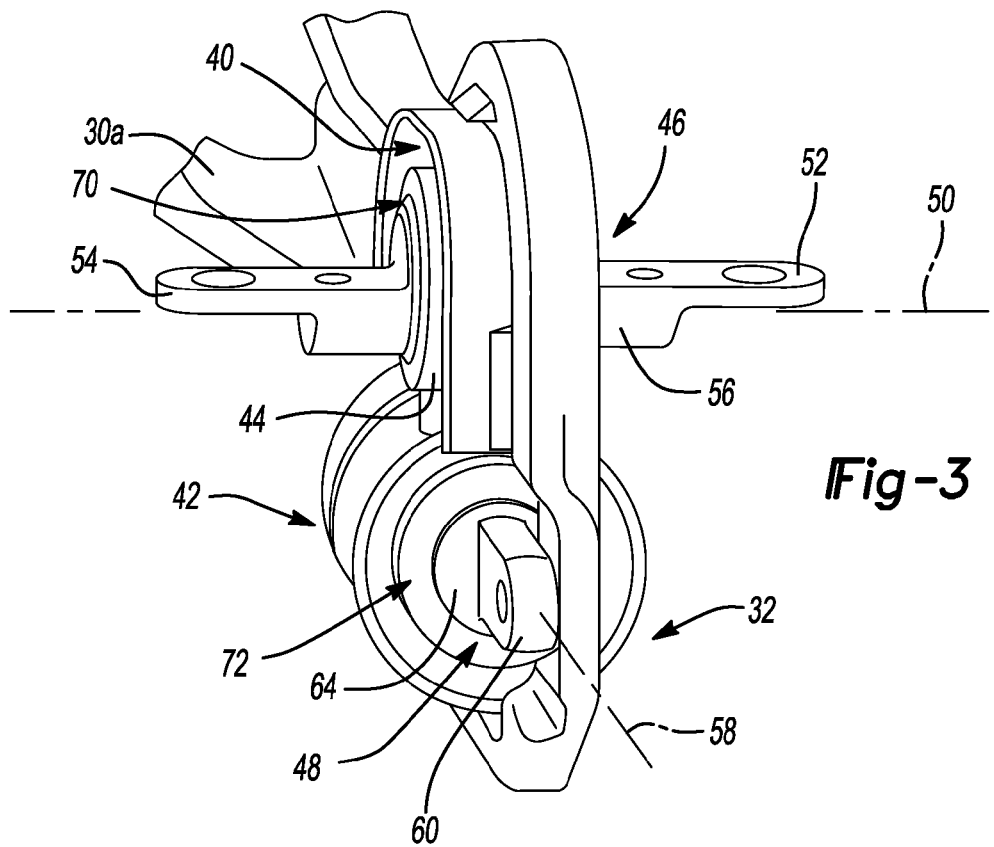
FIG. 3 is a front perspective view of the exemplary link assembly illustrated in FIG. 2 where the exemplary link assembly is shown installed on the longitudinal arm.
Figure 4:
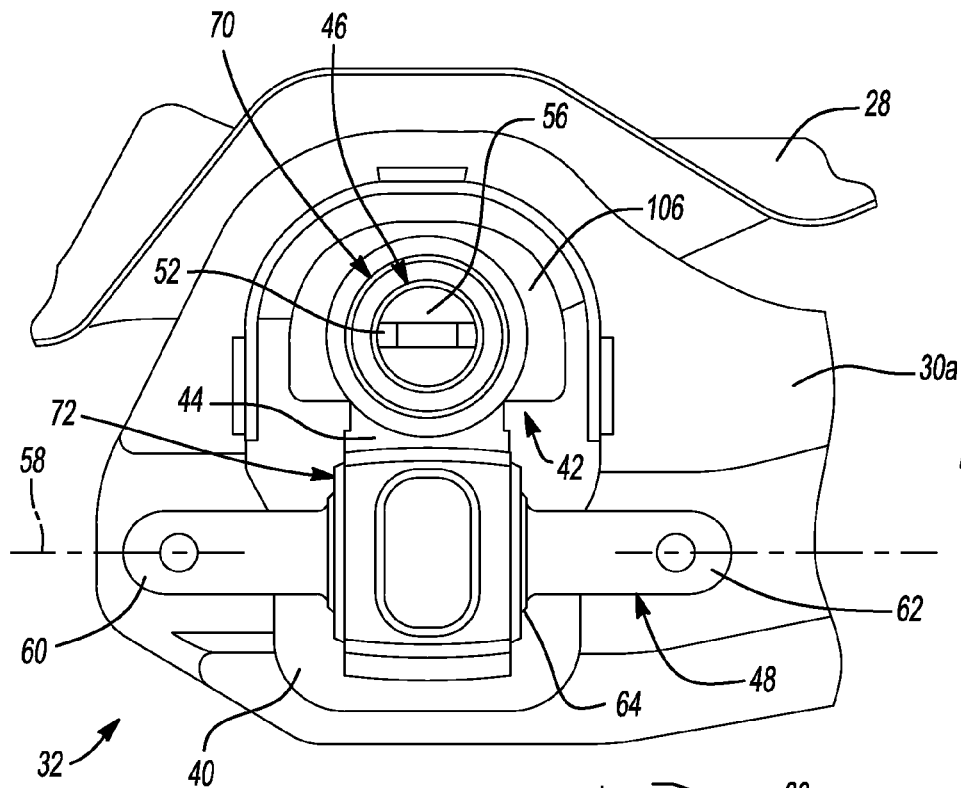
FIG. 4 is a side elevation view of the exemplary link assembly illustrated in FIG. 2 where the exemplary link assembly is shown installed on the longitudinal arm.

With reference to FIGS. 1 and 2, the suspension assembly 20 of the vehicle 22 is illustrated. It should be appreciated that the suspension assembly 20 is a sub-assembly of the vehicle 22. By way of example and without limitation, the vehicle 22 may be an automobile. The suspension assembly 20 generally includes a wheel end assembly 24 that supports the wheel(s) (not shown) of the vehicle 22. The wheel end assembly 24 may be formed as a single piece or alternatively may be constructed of multiple components. In some configurations, the wheel end assembly 24 may support several other components of the vehicle 22 such as a differential, axels, hubs, brake rotors, and brake calipers. The suspension assembly 20 of the vehicle 22 includes one or more mounting locations 26a, 26b. In FIG. 1, first and second mounting locations 26a, 26b are illustrated. The first and second mounting locations 26a, 26b are disposed on the vehicle 22 and are laterally spaced from one another. By way of example and without limitation, the first and second mounting locations 26a, 26b may be located on a body or frame component 28 of the vehicle 22. The suspension assembly 20 also includes one or more longitudinal arms 30a, 30b that extend between the one or more mounting locations 26a, 26b and the wheel end assembly 24. In the example shown in FIG. 1, the suspension assembly 20 includes first and second longitudinal arms 30a, 30b. The first longitudinal arm 30a extends between the first mounting location 26a and the wheel end assembly 24. The second longitudinal arm 30b is coupled to and extends between the second mounting location 26b and the wheel end assembly 24. Each of the first and second longitudinal arms 30a, 30b has a first end 32 that is coupled to one of the first and second mounting locations and a second end 34 that is coupled to the wheel end assembly 24. Although various arrangements are possible, the second end 34 of the first and second longitudinal arms 30a, 30b may be pivotally connected to the wheel end assembly 24. The first and second longitudinal arms 30a, 30b may be made of a variety of different materials, including a metal such as aluminum or steel by way of non-limiting example.

The suspension assembly 20 may also include one or more shock absorbers 36a, 36b and one or more suspension springs 38a, 38b. In the example shown in FIG. 1, the suspension assembly 20 includes first and second shock absorbers 36a, 36b and first and second suspension springs 38a, 38b. The first and second shock absorbers 36a, 36b are coupled to and extend between the wheel end assembly 24 and the vehicle 22. Similarly, the first and second suspension springs 38a, 38b are coupled to and extend between the wheel end assembly 24 and the vehicle 22. Although FIG. 1 shows the first and second shock absorbers 36a, 36b being separate and spaced apart from the first and second suspension springs 38a, 38b, it should be appreciated that these components may be combined to form a coilover strut assembly (not shown). In such a configuration, the first and second suspension springs 38a, 38b may be disposed helically about the first and second shock absorbers 36a, 36b, respectively. Generally, the first and second suspension springs 38a, 38b apply a force against the wheel end assembly 24 that biases the wheel end assembly 24 toward an extended position where the wheel end assembly 24 is positioned away from the vehicle 22. The first and second shock absorbers 36a, 36b dampen (i.e. slow) the movement of the wheel end assembly 24 relative to the vehicle 22 in order to reduce oscillatory movements of the wheel end assembly 24 relative to the vehicle 22 after the vehicle 22 has passed over the bump or excitation. Accordingly, the suspension assembly 20 allows the wheels of the vehicle 22 to travel in one or more directions relative to the vehicle 22, which improves road holding, vehicle handling, and ride comfort.

In FIG. 1, the suspension assembly 20 that is illustrated is configured to support the rear wheels of the vehicle 22. Therefore, the first and second longitudinal arms 30a, 30b may alternatively be referred to as trailing arms. However, it should be appreciated that the disclosed suspension assembly 20 may also be configured to support the front wheels of the vehicle 22. In accordance with such a configuration, the first and second longitudinal arms 30a, 30b may alternatively be referred to as leading arms. It should be understood that the subject disclosure relates to and envisions both arrangements.

The first and second longitudinal arms 30a, 30b each has a pocket 40 that is disposed in the first end 32 of the first and second longitudinal arms 30a, 30b. The pocket 40 may have a variety of different configurations. In the configuration that is shown in the figures, the pocket 40 extends through the first end 32 of the first and second longitudinal arms 30a, 30b. In other words, the pocket 40 forms an opening or window in the first end 32 of the first and second longitudinal arms 30a, 30b. However, it should be appreciated that other configurations are possible. By way of example and without limitation, the pocket 40 may be in the form a depression in the first end 32 of the first and second longitudinal arms 30a, 30b. The pocket 40 of each of the first and second longitudinal arms 30a, 30b receives a link assembly 42 that couples the first end 32 of the first and second longitudinal arms 30a, 30b to the first and second mounting locations 26a, 26b, respectively. As shown in FIGS. 1-4, the first end 32 of the first and second longitudinal arms 30a, 30b may extend around or circumscribe each link assembly 42 where the pocket 40 in the first end 32 extends all the way through the first and second longitudinal arms 30a, 30b. Nonetheless, alternative configurations are possible where the first end 32 of the first and second longitudinal arms 30a, 30b does not extend entirely around the link assembly 42. As will be explained in greater detail below, the connection that each link assembly 42 provides between the first and second mounting locations 26a, 26b and the first and second longitudinal arms 30a, 30b allows the first and second longitudinal arms 30a, 30b to pivot with respect to the first and second mounting locations 26a, 26b. Each link assembly 42 allows the first and second longitudinal arms 30a, 30b to move up and down, side-to-side, fore and aft, and torsionally relative to the first and second mounting locations 26a, 26b.

With reference to FIGS. 2-6, each link assembly 42 includes a link body 44, a first attachment member 46, and a second attachment member 48. The first attachment member 46 is disposed at least partially within the link body 44, defines a first axis 50, and is connected to either the first mounting location 26a or the second mounting location 26b. The first attachment member 46 may have a variety of different shapes and configurations. One such configuration is illustrated in FIGS. 2-6, where the first axis 50 extends co-axially through the first attachment member 46. In accordance with this configuration, the first attachment member 46 has a first attachment end 52, a second attachment end 54, and a first intermediate portion 56 that extends between the first attachment end 52 and the second attachment end 54. The first and second attachment ends 52, 54 are fixedly connected to either the first mounting location 26a or the second mounting location 26b. By way of example and without limitation, the first and second attachment ends 52, 54 of the first attachment member 46 may be bolted, screwed, riveted, welded, glued, or clamped to either the first mounting location 26a or the second mounting location 26b. Although other arrangements are possible, the first intermediate portion 56 may have a cylindrical shape that is co-axially aligned with the first axis 50. The second attachment member 48 is disposed at least partially within the link body 44, defines a second axis 58, and is connected to either the first longitudinal arm 30a or the second longitudinal arm 30b. Like the first attachment member 46, the second attachment member 48 may have a variety of different shapes and configurations. One such configuration is illustrated in FIGS. 2-6, where the second axis 58 extends co-axially through the second attachment member 48. In accordance with this configuration, the second attachment member 48 has a forward attachment end 60, an aft attachment end 62, and a second intermediate portion 64 that extends between the forward attachment end 60 and the aft attachment end 62. The forward and aft attachment ends 60, 62 are fixedly connected to either the first longitudinal aim 30a or the second longitudinal arm 30b on opposing sides of the pocket 40. Accordingly, the second attachment member 48 spans the pocket 40. Although other arrangements are possible, the second intermediate portion 64 may have a cylindrical shape that is co-axially aligned with the second axis 58. The first and second attachment members 46, 48 may be made of a variety of different materials, including a metal such as aluminum for example.

Figure 5:
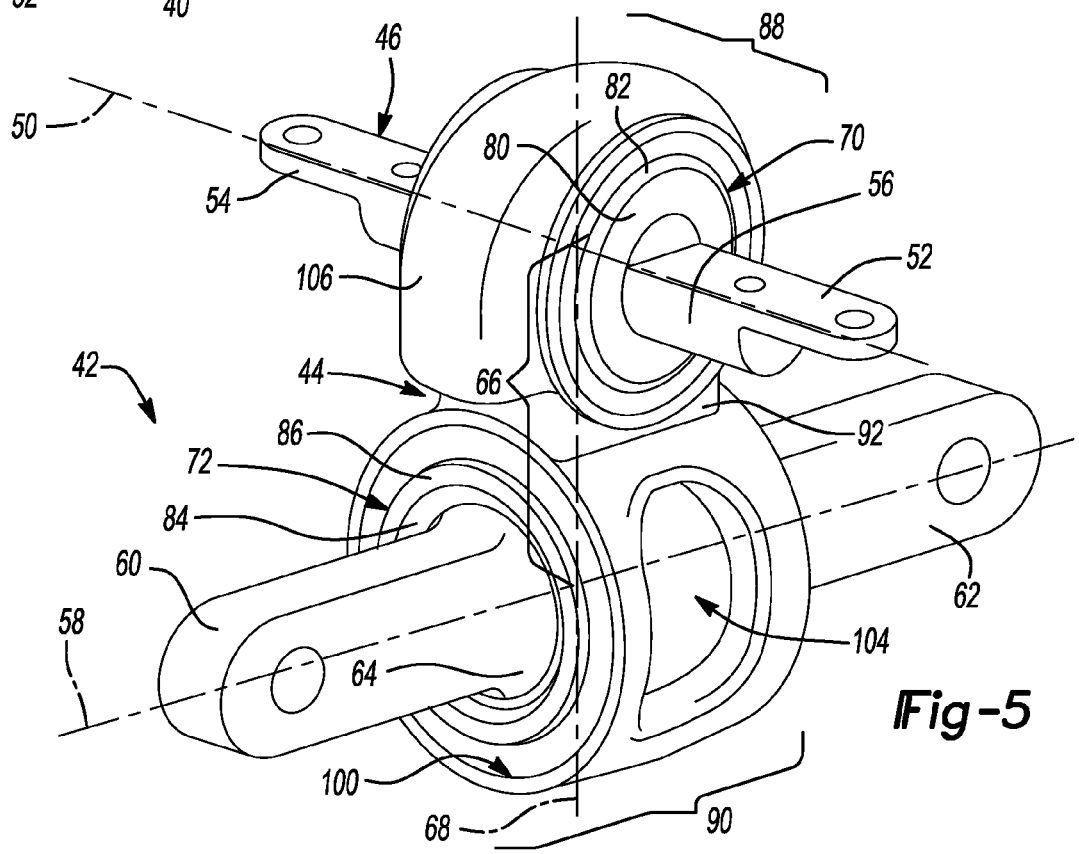
FIG. 5 is another side perspective view of the exemplary link assembly illustrated in FIG. 2 where the exemplary link assembly has been removed from the longitudinal link.
Figure 6:
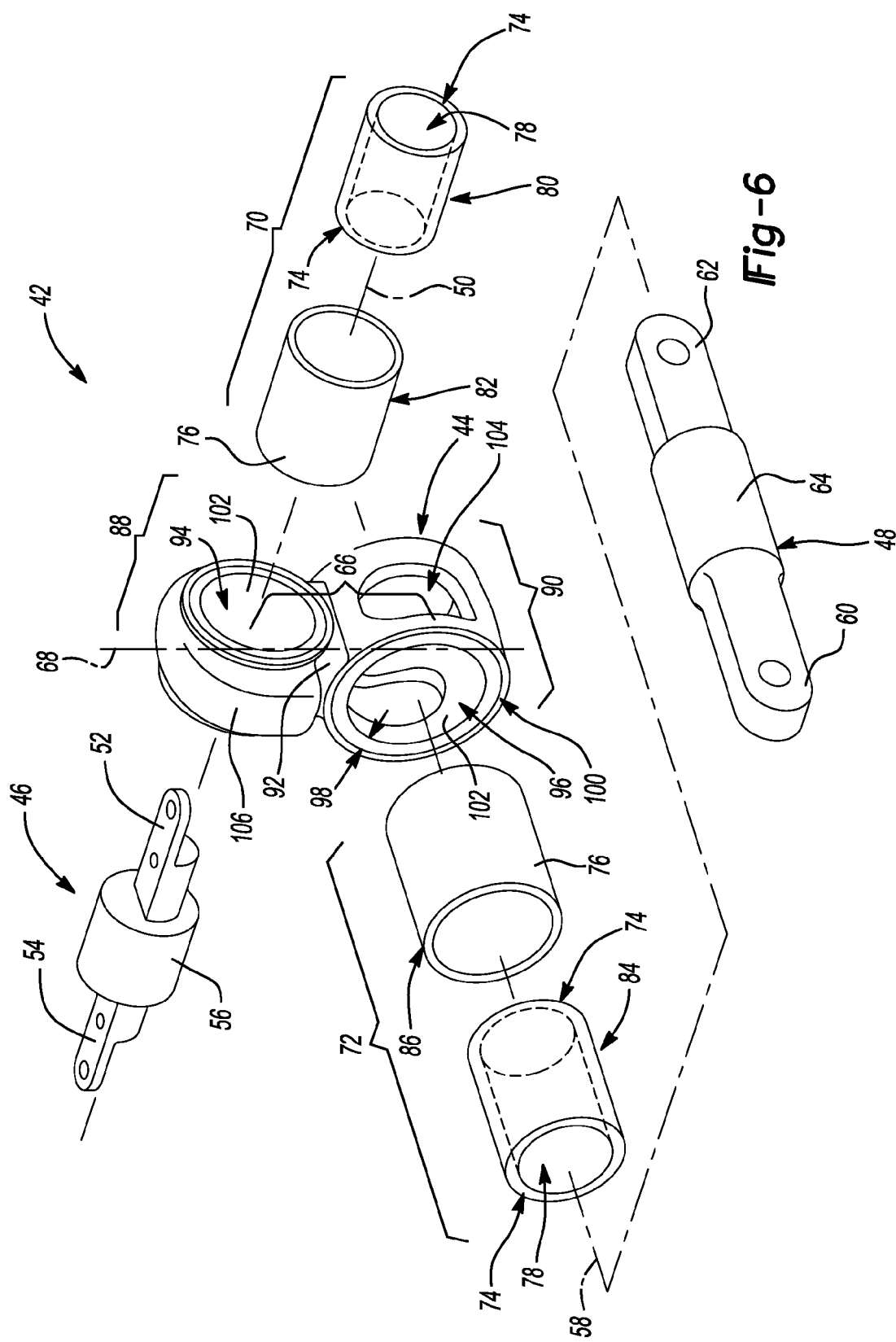
FIG. 6 is an exploded perspective view of the exemplary link assembly illustrated in FIG. 5.

As best seen in FIGS. 5 and 6, the first axis 50 is spaced from the second axis 58 by an off-set distance 66 and the first axis 50 and the second axis 58 extend in different, non-parallel directions. It should be understood that the term different, non-parallel directions expressly excludes link assembly arrangements that have two parallel axes or two co-axially arranged axes. Although the orientations of the first axis 50 and the second axis 58 may be reversed, in the example shown in the figures, the first axis 50 is closer to the first and second mounting locations 26a, 26b (i.e. is closer to the body or frame of the vehicle 22) than the second axis 58. In other words, the first attachment member 46 and thus the first axis 50 is positioned above the second attachment member 48 and thus the second axis 58 in the example shown in the figures. The off-set distance 66 between the first axis 50 and the second axis 58 is measured along a transverse axis 68 that is perpendicular to and that intersects the first axis 50 and the second axis 58. The off-set distance 66 may vary based on the application, but the off-set distance 66 is always greater than zero. Because the first axis 50 is spaced from the second axis 58, the first axis 50 and the second axis 58 do not intersect; however, since the first axis 50 and the second axis 58 extend in different, non-parallel directions, the first axis 50 and the second axis 58 are either arranged perpendicularly with respect to one another or are oriented at an oblique angle relative to one another when viewed from a point disposed along the transverse axis 68 (e.g. when viewed from above). It should also be appreciated that the first and second longitudinal arms 30a, 30b may generally be aligned with the second axis 58 of each respective link assembly 42. In other words, the first and second longitudinal arms 30a, 30b may extend along or parallel to the second axis 58 of each respective link assembly 42. However, it should be understood that there are configurations where this alignment is not present, particularly where the first and second longitudinal arms 30a, 30b are curved.

Still referring to FIGS. 2-6, the link assembly 42 includes a first bushing assembly 70 and a second bushing assembly 72 that are at least partially disposed in the link body 44. As best seen in FIG. 6, the first and second bushing assemblies 70, 72 generally include a pair of ends 74, an outer face 76 that extends between the pair of ends 74, and an inner bore 78 that is open at the pair of ends 74. The first bushing assembly 70 is disposed annularly about the first intermediate portion 56 of the first attachment member 46. Accordingly, the first bushing assembly 70 is co-axially aligned with the first axis 50. The first bushing assembly 70 includes a first bushing 80 that defines the pair of ends 74 and the inner bore 78 of the first bushing assembly 70. The inner bore 78 of the first bushing assembly 70 receives the first attachment member 46 such that the first bushing 80 abuts the first intermediate portion 56 of the first attachment member 46. The first bushing assembly 70 optional includes a first sleeve 82 that is positioned radially between the first bushing 80 and the link body 44. When the first sleeve 82 is present, the first sleeve 82 defines the outer face 76 of the first bushing assembly 70. Otherwise, the first bushing 80 itself defines the outer face 76 of the first bushing assembly 70.

The second bushing assembly 72 is disposed annularly about the second intermediate portion 64 of the second attachment member 48. Accordingly, the second bushing assembly 72 is co-axially aligned with the second axis 58. The second bushing assembly 72 includes a second bushing 84 that defines the pair of ends 74 and the inner bore 78 of the second bushing assembly 72. The inner bore 78 of second bushing assembly 72 receives the second attachment member 48 such that the second bushing 84 abuts the second intermediate portion 64 of the second attachment member 48. Optionally, the second bushing assembly 72 includes a second sleeve 86 that is positioned radially between the second bushing 84 and the link body 44. When the second sleeve 86 is present, the second sleeve 86 defines the outer face 76 of the second bushing assembly 72. Otherwise, the second bushing 84 itself defines the outer face 76 of the second bushing assembly 72.

The first and second bushings 80, 84 may be made of a wide variety of different materials, including without limitation, elastomeric materials such as natural rubber. The first and second bushings 80, 84 may be made from the same material or different materials. By way of non-limiting example, the first and second bushings 80, 84 may be made of different elastomeric materials having different durometers. Although the first and second bushing assemblies 70, 72 shown and described herein are generally cylindrical in shape, it should be appreciated that the first and second bushing assemblies 70, 72 may have a different shape. By way of example and without limitations, the first and second bushing assemblies 70, 72 may have a triangular, rectangular, oval, or polygon shaped cross-section.

Together, the first and second bushings 80, 84 give the link assembly 42 a first travel distance that is measured along the second axis 58 and a second travel distance that is measured along the transverse axis 68. Although the configuration and orientation of the link assembly 42, the suspension assembly 20, and the vehicle 22 may change, it should generally be understood that in the figures, the first axis 50 corresponds with a lateral direction (i.e. side-to-side movement), the second axis 58 corresponds with a longitudinal direction (i.e. fore and aft movement), and the transverse axis 68 corresponds with a vertical direction (i.e. up and down movement) with respect to the vehicle 22. In accordance with this convention, the first bushing assembly 70 may alternatively be referred to as the upper bushing assembly and the second bushing assembly 72 may alternatively be referred to as the lower bushing assembly. The first travel distance may alternatively be referred to as the longitudinal travel distance and the second travel distance may alternatively be referred to as the vertical travel distance. Advantageously, the size, geometry, and durometer (i.e. hardness) of the first and second bushings 80, 84 may be selected such that the second travel distance (i.e. the vertical travel distance) of the link assembly 42 is less than the first travel distance (i.e. the longitudinal travel distance) of the link assembly 42. In a similar fashion, the first and second bushings 80, 84 provide a first spring rate that is measured along the second axis 58 and a second spring rate that is measured along the transverse axis 68. Based on the above discussion of the first axis 50, the second axis 58, and the transverse axis 68, it should be understood that the first spring rate may alternatively be called the longitudinal rate and the second spring rate may alternatively be call the vertical rate. Advantageously, the configuration of the first and second bushing assemblies 70, 72 relative to one another (i.e. the relative orientation of the first axis 50 and the second axis 58) allow the second spring rate (i.e. the vertical rate) to be much greater (i.e. higher) than the first spring rate (i.e. the longitudinal rate). Specifically, the first spring rate may be less than 500 Newtons per millimeter (N/mm) and the second spring rate may be greater than 1,500 Newtons per millimeter (N/mm). For example, testing has shown that a first spring rate of approximately 250 Newtons per millimeter (N/mm) and a second spring rate of greater than 2,000 Newtons per millimeter (N/mm) may be achieved.

As shown in FIGS. 5 and 6, the link body 44 includes a first bushing receptacle 88, a second bushing receptacle 90, and a bridge portion 92. Although the link body 44 shown in the figures is made of a single, cast iron piece, it should be appreciated that the link body 44 may be made of other materials and may be made by assembling multiple components. The first bushing receptacle 88 receives and supports the first bushing assembly 70 and the first attachment member 46. The second bushing receptacle 90 receives and supports the second bushing assembly 72 and the second attachment member 48. More specifically, the first sleeve 82 of the first bushing assembly 70 may be press fit into a first cavity 94 that is defined by the first bushing receptacle 88 and the second sleeve 86 of the second bushing assembly 72 may be press fit into a second cavity 96 that is defined by the second bushing receptacle 90. Accordingly, the link body 44 extends about the outer face 76 of the first bushing assembly 70 and the outer face 76 of the second bushing assembly 72 in an abutting relationship. More particularly, the link body 44 circumscribes the first bushing assembly 70 at the first bushing receptacle 88 and circumscribes the second bushing assembly 72 at the second bushing receptacle 90.

The bridge portion 92 of the link body 44 extends between and interconnects the first and second bushing receptacles 88, 90. It should be appreciated that were the offset distance 66 is smaller, the bridge portion 92 may be small and may be formed by a thickness 98 of the first and second bushing receptacles 88, 90. As such, the bridge portion 92 is located between the first and second cavities 94, 96. The link body 44 has an outer surface 100 and an inner surface 102. The inner surface 102 of the link body 44 abuts the first and second sleeves 82, 86 in the first and second bores of the first and second bushing receptacles 88, 90, respectively. The outer surface 100 of the link body 44 spans the first bushing receptacle 88, the second bushing receptacle 90, and the bridge portion 92. At least some portions of the outer surface 100 of the link body 44 oppose the pocket 40 of each of the first and second longitudinal arms 30a, 30b. The outer surface 100 of the link body 44 may optionally include one or more depressions 104 disposed along the second bushing receptacle 90 to provide clearance for other components of the vehicle 22 and/or components used during the assembly of the vehicle 22. These depressions 104 may or may not extend through the link body 44 to expose a portion of the first sleeve 82.

Figure 7:
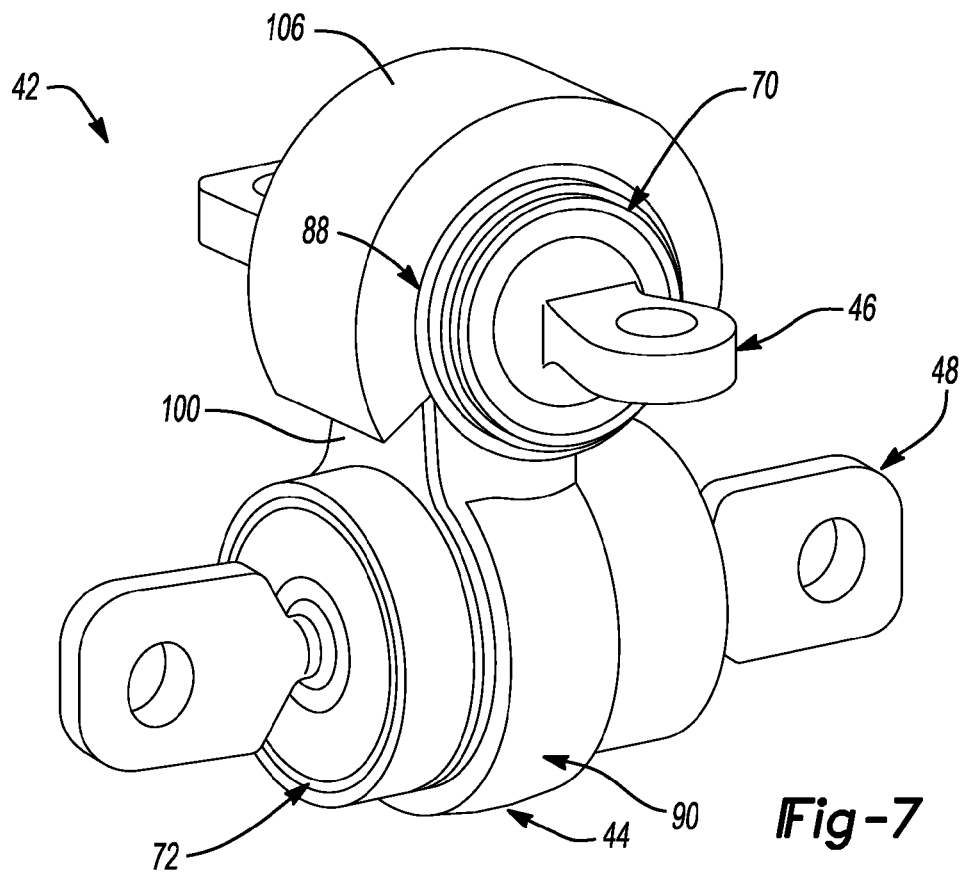
FIG. 7 is a side perspective view of another exemplary link assembly constructed in accordance with the subject disclosure where the exemplary link assembly includes a top mounted snubber.
Figure 8:
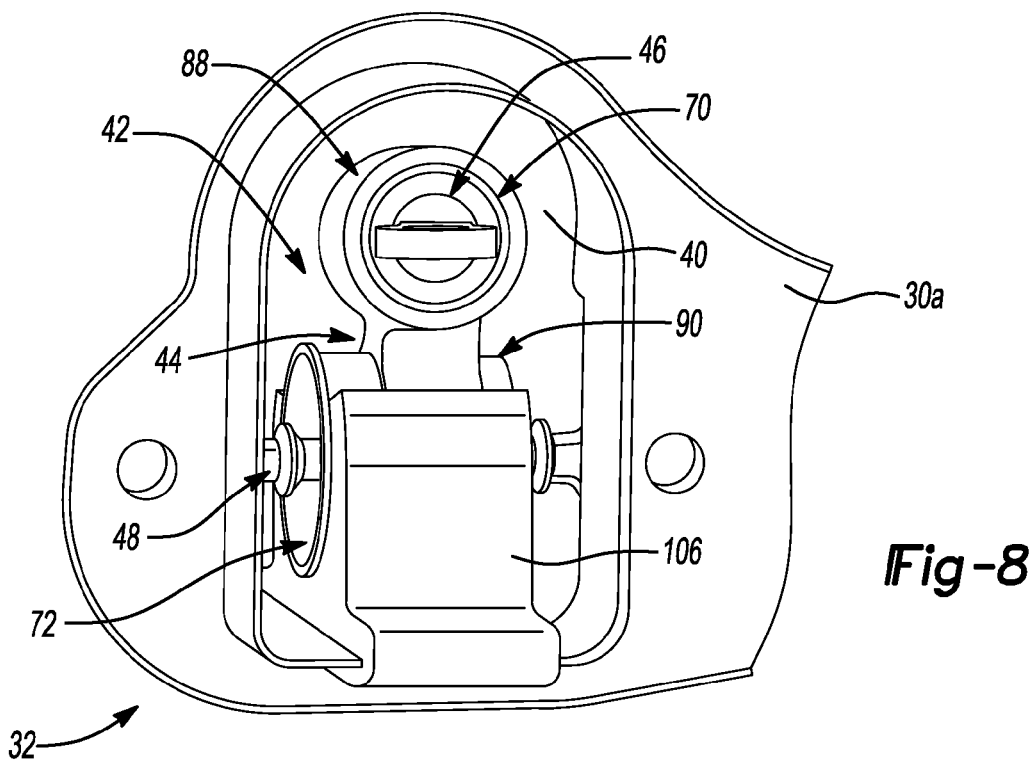
FIG. 8 is a side perspective view of another exemplary link assembly constructed in accordance with the subject disclosure where the longitudinal arm includes a pocket mounted snubber.

With reference to FIGS. 4, 7, 8, and 10 a snubber 106 may optionally be disposed in the pocket 40 of the first longitudinal arm 30a between the outer surface 100 of the link body 44 and the first longitudinal arms 30a. The snubber 106 helps cushion the link body 44 as it moves within the pocket 40. Specifically, the snubber 106 is squeezed between the outer surface 100 of the link body 44 and the first longitudinal arm 30a when the outer surface 100 of the link body 44 moves sufficiently close to either the first longitudinal arm 30a. The pocket 40 of the second longitudinal arms 30b may be similarly constructed. Although the snubber 106 may be made of a wide variety of materials, by way of example and without limitation, the snubber 106 may be made of a resilient material or an elastomeric material such as natural rubber. In FIG. 7, the snubber 106 is disposed on and attached to the outer surface 100 of the link body 44. More specifically, the snubber 106 is attached to the first bushing receptacle 88 and covers only a portion of the outer surface 100 of the link body 44. Alternatively, the snubber 106 may be attached to the second bushing receptacle 90 (not shown), or both (not shown). In FIG. 8, the snubber 106 is disposed in the pocket 40 and is attached to the longitudinal arm 30a. The snubber 106 in this configuration generally opposes the second bushing receptacle 90, but it should be appreciated that the snubber 106 could alternatively be arranged to oppose the first bushing receptacle 88 (not shown), or both (not shown). FIG. 9 illustrates the link body 44 of the link assembly 42 and FIG. 10 illustrates another configuration where the snubber 106 covers substantially all of the outer surface 100 of the link body 44. In accordance with this configuration, the link body 44 of FIG. 9 may be overmolded with the elastomeric material forming the snubber 106 shown in FIG. 10. As FIG. 10 illustrates, the snubber 106 may have a variable thickness 108. In addition to the cushioning benefits provided by the snubber 106, the snubber 106 may advantageously protect the outer surface 100 of the link body 44 from corrosion when the snubber 106 covers substantially all of the outer surface 100 of the link body 44.

Figure 11:
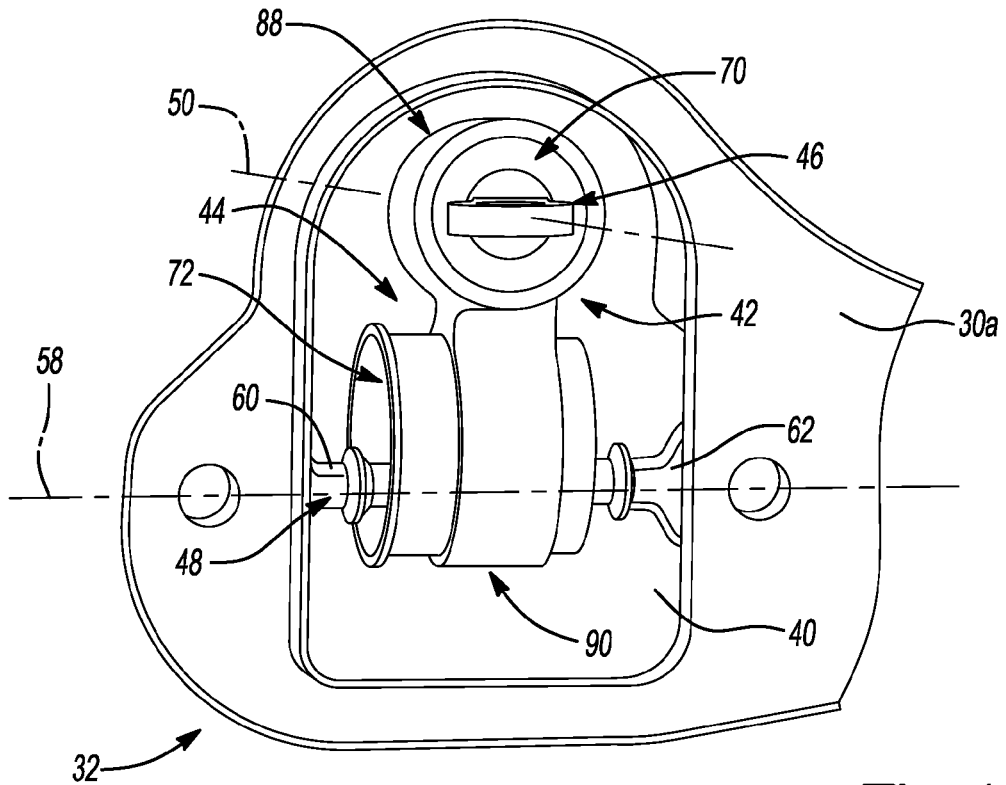
FIG. 11 is a side perspective view of the exemplary link assembly illustrated in FIG. 2 where the link body is shifted upwards relative to the longitudinal arm.
Figure 12:
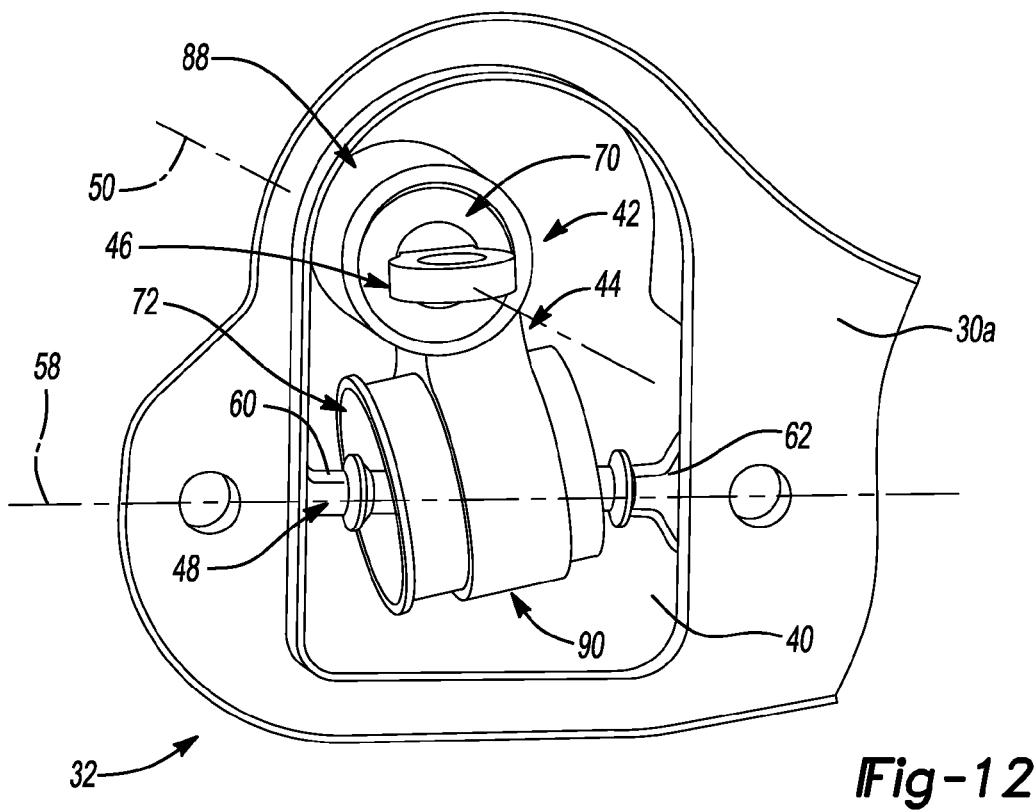
FIG. 12 is a side perspective view of the exemplary link assembly illustrated in FIG. 2 where the link body is rotated relative to the longitudinal arm.

As illustrated in FIGS. 11 and 12 (and with additional reference to FIG. 1), the link body 44 and the first attachment member 46 can move within the pocket 40 in response to movement of the wheel end assembly 24, and thus, movement of the first and second longitudinal arms 30a, 30b. Each of the first and second bushing assemblies 70, 72 have four different modes of movement. The first mode of movement is the radial mode. As illustrated in FIG. 11, the radial mode occurs, for example, when both the forward and aft attachment ends 60, 62 of the second attachment member 48 are displaced equally up and down or side-to-side relative to the link body 44. The first and second bushing assemblies 70, 72 allow the first and second longitudinal aims 30a, 30b to move up and down and side-to-side relative to the first and second mounting locations 26a, 26b in the radial mode. The second mode of movement is the axial mode. The axial mode occurs, for example, when the second attachment member 48 is pushed or pulled along the second axis 58 such that the second attachment member 48 moves longitudinally (i.e. fore and aft) relative to the link body 44. The first and second bushing assemblies 70, 72 allow the first and second longitudinal arms 30a, 30b to move fore and aft and side-to-side relative to the first and second mounting locations 26a, 26b in the second mode of movement. The third mode of movement is the torsional mode. The torsional mode occurs, for example, when the second attachment member 48 is rotated or spun about the second axis 58 in a twisting movement of the second attachment member 48 relative to the link body 44. The first and second bushing assemblies 70, 72 allow the first and second longitudinal aims 30a, 30b to swing or pivot relative to the first and second mounting locations 26a, 26b in the torsional mode. The fourth mode of movement is the conical mode. As illustrated in FIG. 12, the conical mode occurs, for example, when the forward attachment end 60 of the second attachment member 48 is displaced up as the aft attachment end 62 of the second attachment member 48 is displaced down in a rocking movement of the second attachment member 48 (or alternatively a side-to-side rocking movement) relative to the link body 44. The first and second bushing assemblies 70, 72 allow the first and second longitudinal arms 30a, 30b to pivot or twist relative to the first and second mounting locations 26a, 26b in the conical mode. Although this paragraph discusses the four modes of movement with reference to the second bushing assembly 72, it is understood that the same applies to the first bushing assembly 70.

Together, the first and second bushing assemblies 70, 72 provide the travel distances, and spring rates of the overall link assembly 42. Because the first and second bushing assemblies 70, 72 are separate and discrete, and because the first axis 50 and the second axis 58 are spaced apart and extend in different, non-parallel directions, a more extreme relationship between the first and second travel distances and the first and second spring rates can be achieved compared to designs that utilize single bushing assemblies to pivotally couple the first and second longitudinal arms 30a, 30b to the body or frame component 28 of the vehicle 22. Typically, the first and second bushing assemblies 70, 72 provide a very low spring rate in the torsional mode such that the first bushing assembly 70 permits the first and second longitudinal arms 30a, 30b to pivot about the first attachment member 46 with little resistance. Accordingly, the first attachment member 46 and therefore the first axis 50 act as a primary pivot point for the first and second longitudinal arms 30a, 30b of the suspension assembly 20.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. These antecedent recitations should be interpreted to cover any combination in which the inventive novelty exercises its utility. Many modifications and variations of the present invention are possible in light of the above teachings and may be practiced otherwise than as specifically described while within the scope of the appended claims.

What is claimed is:
1. A link assembly for a vehicle suspension comprising:
a link body;
a first attachment member at least partially disposed in said link body that defines a first axis;
a second attachment member at least partially disposed in said link body that defines a second axis;
a first bushing assembly at least partially disposed in said link body that supports said first attachment member in said link body;
a second bushing assembly at least partially disposed in said link body that supports said second attachment member in said link body; said first axis being spaced from said second axis by an off-set distance;
a longitudinal arm aligned with said second axis and connected to said second attachment member; said first axis and second axis extending in different non-parallel directions, wherein said off-set distance is measured along a transverse axis that is perpendicular to and intersects said first axis and said second axis, wherein said first bushing assembly and said second bushing assembly each include a pair of ends and an outer face that extends between said pair of ends and wherein said link body extends about said outer face of said first and second bushing assemblies in an abutting relationship.

2. The link assembly as set forth in claim 1 wherein said first bushing assembly includes a first bushing that extends about said first attachment member and said second bushing assembly includes a second bushing that extends about said second attachment member.

3. The link assembly as set forth in claim 2 wherein said first and second bushings give said link assembly a first travel distance that is measured along said second axis and a second travel distance that is less than said first travel distance and that is measured along said transverse axis.

4. The link assembly as set forth in claim 3 wherein said first and second bushings provide a first spring rate that is measured along said second axis and a second spring rate that is measured along said transverse axis and that is greater than said first spring rate.

5. The link assembly as set forth in claim 4 wherein said first spring rate is less than 500 Newtons per millimeter and said second spring rate is greater than 1,500 Newtons per millimeter.

6. The link assembly as set forth in claim 2 wherein said first and second bushings are made of different elastomeric materials having different durometers.

7. The link assembly as set forth in claim 2 wherein said link body includes a first bushing receptacle defining a first cavity that receives and supports said first bushing assembly and said first attachment member, a second bushing receptacle defining a second cavity that receives and supports said second bushing assembly and said second attachment member, and a bridge portion extending between and interconnecting said first and second bushing receptacles.

8. The link assembly as set forth in claim 1 wherein said link body has an outer surface and wherein said link assembly includes a snubber made of a resilient material that is disposed on and attached to said outer surface of said link body.

9. The link assembly as set forth in claim 8 wherein said snubber is a coating having a variable thickness that covers said outer surface of said link body.

10. The link assembly as set forth in claim 1 wherein said link body circumscribes said first bushing assembly at a first bushing receptacle and circumscribes said second bushing assembly at a second bushing receptacle.

11. The link assembly as set forth in claim 1 wherein said first axis and said second axis are arranged perpendicularly with respect to one another.

12. A suspension assembly for a vehicle comprising:
a mounting location disposed on the vehicle;
a wheel end assembly;
a longitudinal arm extending between said mounting location and said wheel end assembly; said longitudinal arm including a first end that is coupled to said mounting location and a second end that is coupled to said wheel end assembly; said longitudinal arm having a pocket that is disposed at said first end of said longitudinal arm; said pocket receiving a link assembly that couples said first end of said longitudinal arm to said mounting location; said link assembly including a link body, a first attachment member, and a second attachment member, such that said first end of said longitudinal arm circumscribes said link assembly; said first attachment member being connected to said mounting location and defining a first axis; said second attachment member being connected to said longitudinal arm and defining a second axis; said link assembly including a first bushing assembly that supports said first attachment member in said link body and a second bushing assembly that supports said second attachment member in said link body; and said first axis being spaced from said second axis by an off-set distance and said first axis and said second axis extending in different non-parallel directions such that said first and second bushing assemblies of said link assembly allow said longitudinal arm to pivot relative to said mounting location and such that said first attachment member and said link body are moveable within said pocket.

13. The suspension assembly as set forth in claim 12 wherein said off-set distance is measured along a transverse axis that is perpendicular to and intersects said first axis and said second axis.

14. The suspension assembly as set forth in claim 13 wherein said first bushing assembly and said second bushing assembly each include a pair of ends and an outer face that extends between said pair of ends and wherein said link body extends about said outer face of said first and second bushing assemblies in an abutting relationship.

15. The suspension assembly as set forth in claim 14 wherein said first bushing assembly includes a first bushing that extends about said first attachment member and said second bushing assembly includes a second bushing that extends about said second attachment member.

16. The suspension assembly as set forth in claim 15 further comprising:
a snubber made of an elastomeric material that is disposed in said pocket between said link body and said longitudinal arm.

17. The suspension assembly as set forth in claim 16 wherein said snubber is attached to said longitudinal arm.

* * * * *